US008259556B2

(12) United States Patent  
Takaoka et al.

(10) Patent No.: US 8,259,556 B2  
(45) Date of Patent: Sep. 4, 2012

(54) INFORMATION RECORDING MEDIUM, RECORDING APPARATUS, REPRODUCING APPARATUS AND REPRODUCING METHOD

(75) Inventors: Tomoyasu Takaoka, Osaka (JP); Shigeru Furumiya, Hyogo (JP); Naoyasu Miyagawa, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/745,086

(22) PCT Filed: Nov. 19, 2009

(86) PCT No.: PCT/JP2009/006251
§ 371 (c)(1),
(2), (4) Date: May 27, 2010

(87) PCT Pub. No.: WO2010/061557
PCT Pub. Date: Jun. 3, 2010

(65) Prior Publication Data
US 2010/0302921 A1   Dec. 2, 2010

(30) Foreign Application Priority Data

Nov. 26, 2008   (JP) ................................. 2008-301463

(51) Int. Cl.
*G11B 7/24* (2006.01)
*G11B 7/00* (2006.01)
(52) U.S. Cl. .................... 369/275.1; 369/283; 369/47.5; 369/59.11; 369/116
(58) Field of Classification Search .................. 369/286, 369/94
See application file for complete search history.

(56) References Cited

U.S. PATENT DOCUMENTS

| 5,627,816 | A | * | 5/1997 | Ito et al. ...................... 369/275.1 |
| 6,014,363 | A | * | 1/2000 | Nakamura et al. ......... 369/275.1 |
| 6,221,455 | B1 | * | 4/2001 | Yasuda et al. ................ 428/64.1 |

(Continued)

FOREIGN PATENT DOCUMENTS

EP   0 957 477 A2   11/1999
(Continued)

OTHER PUBLICATIONS

MAT (Machine assisted translation) of JP 11-16208.*
(Continued)

*Primary Examiner* — Muhammad N Edun
(74) *Attorney, Agent, or Firm* — Renner, Otto, Boisselle & Sklar, LLP

(57) ABSTRACT

An information recording medium, comprising N number (N is an integer fulfilling N≧3) of information layers on which information is recordable, and allowing information to be recorded on each of the information layers and allowing information recorded on each of the information layers to be reproduced by being irradiated with laser light. The N number of information layers include an N'th information layer, an (N−1)th information layer, an (N−2)th information layer, . . . a second information layer and a first information layer sequentially located from a laser light incidence side. A reflectance of the N'th information layer is $R_N$, and a reflectance of an M'th information layer (M refers to every integer fulfilling N>M≧1) is $R_M$. The laser light used to irradiate the N'th information layer for reproducing information recorded on the N'th information layer has an upper limit reproduction power $Pr_{Nmax}$, and the laser light used to irradiate the M'th information layer for reproducing information recorded on the M'th information layer has an upper limit reproduction power $Pr_{Mmax}$. The following expressions (1) and (2) are concurrently fulfilled:

$$R_N > R_M \qquad (1)$$

$$Pr_{Nmax} < Pr_{Mmax} \qquad (2).$$

8 Claims, 3 Drawing Sheets

U.S. PATENT DOCUMENTS

| | | | |
|---|---|---|---|
| 6,240,060 B1 * | 5/2001 | Kikitsu et al. | 369/275.1 |
| 6,456,584 B1 | 9/2002 | Nagata et al. | |
| 6,511,788 B1 | 1/2003 | Yasuda et al. | |
| 6,610,380 B2 * | 8/2003 | Kitaura et al. | 428/64.1 |
| 6,731,584 B1 | 5/2004 | Nagara | |
| 6,747,944 B2 * | 6/2004 | Higuchi | 369/286 |
| 7,232,598 B2 | 6/2007 | Ahn et al. | |
| 7,260,053 B2 | 8/2007 | Harigaya et al. | |
| 7,464,390 B2 * | 12/2008 | Shinotsuka et al. | 720/718 |
| 7,623,433 B2 | 11/2009 | Ohkubo | |
| 7,668,070 B2 | 2/2010 | Ohkubo | |
| 8,017,208 B2 * | 9/2011 | Tsuchino et al. | 428/64.1 |
| 2004/0105182 A1 | 6/2004 | Nishihara et al. | |
| 2005/0073935 A1 | 4/2005 | Miura et al. | |
| 2006/0072415 A1 | 4/2006 | Lee et al. | |
| 2007/0237062 A1 | 10/2007 | Shinotsuka et al. | |
| 2009/0016188 A1 * | 1/2009 | Nakamura et al. | 369/94 |
| 2010/0039911 A1 | 2/2010 | Kikukawa et al. | |

FOREIGN PATENT DOCUMENTS

| | | |
|---|---|---|
| EP | 1 172 811 A2 | 1/2002 |
| EP | 1 187 119 A2 | 3/2002 |
| EP | 1 548 722 A1 | 6/2005 |
| JP | 11-16208 * | 1/1999 |
| JP | 2000-036130 | 2/2000 |
| JP | 2001-014679 | 1/2001 |
| JP | 2002-237090 | 8/2002 |
| JP | 03-242655 | 8/2003 |
| JP | 2008-065965 | 3/2008 |
| JP | 2008-243304 | 10/2008 |
| JP | 2008-243304 A | 10/2008 |
| JP | 2010-009702 | 1/2010 |
| WO | 03/025922 | 3/2003 |

OTHER PUBLICATIONS

International Search Report and Written Opinion for corresponding International Application No. PCT/JP2009/006251 mailed Feb. 16, 2010.

Form PCT/ISA/237 and partial English translation for International Application No. PCT/JP2009/006251 dated Feb. 16, 2010.

International Search Report for corresponding International Application No. PCT/JP2009/006252 mailed Feb. 16, 2010.

Form PCT/ISA/237 and partial English translation for International Application No. PCT/JP2009/006252 dated Feb. 16, 2010.

Supplementary European Search Report for corresponding European Application No. EP 09 82 8807 issued on May 3, 2012.

* cited by examiner

INFORMATION RECORDING MEDIUM, RECORDING APPARATUS, REPRODUCING APPARATUS AND REPRODUCING METHOD

TECHNICAL FIELD

The present invention relates to an information recording medium, specifically an information recording medium including three or more information layers usable for recording of information and reproduction of recorded information performed using laser light radiation, recording apparatus for performing recording on this information recording medium, a reproducing apparatus for performing reproduction from this information recording medium, and a method for performing reproduction from this information recording medium.

BACKGROUND ART

Recently, information recording mediums usable for recording, erasure, rewriting and reproduction of information by laser light radiation have been widely researched and developed, and made into commercial products. Such an information recording medium has an information layer including a recording layer formed of a thin film of a phase-changeable recording material or the like. For recording information, the recording layer is irradiated with laser light and thus locally heated to form areas having different optical constants because of different radiation conditions. For example, information is recorded by changing the state of the phase-changeable material of the recording layer between a crystalline phase and an amorphous phase by heat generated by laser light radiation. Specifically, for example, a combination of a space and a mark represented by lengths based on a signal modulated by information to be recorded is formed on a track of the recording layer.

Among information recording mediums using a phase-changeable material for the recording layer, a rewritable information recording medium allows information to be erased or rewritten because the phase-changeable material is reversibly phase-changeable. In the case of such a rewritable information recording medium, the initial state of the recording layer is generally the crystalline phase. For recording information, laser light of a high power is directed toward the recording layer to melt a part of the recording layer. Then, the recording layer is rapidly cooled to put the part of the recording layer irradiated with the laser light into the amorphous phase. For erasing information, laser light of a power lower than that used for recording is directed toward the recording layer to raise the temperature of a part of the recording layer. Then, the recording layer is slowly cooled to put the part of the recording layer irradiated with the laser light into the crystalline phase. In addition, laser light of a power modulated between a high power and a low power may be directed toward the recording layer. Thus, while the recorded information is erased, new information can be recorded. Namely, rewriting is possible.

In order to carry out erasure or rewriting of information at high speed, it is necessary to change the phase from the amorphous phase to the crystalline phase within a short time. Namely, in order to realize high erasure performance in a rewritable information recording medium, it is necessary to use a phase-changeable material having a high crystallization rate for the recording layer. In the case of a write once information recording medium using a material which is not reversibly phase-changed for a recording layer, information rewriting is impossible. On such an information recording medium, information can be recorded only once.

Information recorded on an information recording medium is reproduced by detecting a light amount change of the reflected light based on the reflectance difference between the crystalline phase and the amorphous phase. Specifically, this is performed by irradiating the information recording medium with laser light which is set to a certain reproduction power and detecting the intensity of the light reflected from the information recording medium as a signal. The intensity of the reflected light is in proportion to a product of the reflectance of the information recording medium and the reproduction power of the laser light. In general, as the intensity of the reflected light is higher, the information reproduction signal quality is higher. Therefore, it is preferable that the reproduction power is higher.

However, where the reproduction power is too high when information is to be reproduced from a recordable information recording medium such as a rewritable information recording medium or a write once information recording medium, the state of the mark or space formed on the recording layer of the information recording medium is changed, and the quality of the reproduction signal to be obtained is deteriorated. Namely, the information represented by the mark or space formed on the information recording medium is deteriorated. For this reason, the energy of laser light for irradiating the information recording medium for reproduction, namely, the reproduction power, is set not to be too high (see Patent Document No. 1). The degree at which information deterioration due to reproduction is unlikely to occur is called reproduction durability. Hereinafter, the upper limit of the reproduction power at which the information remains non-deteriorated when being reproduced is called "upper limit reproduction power". As the reproduction durability of an information recording medium is higher, the upper limit reproduction power of the information recording medium is higher. The upper limit reproduction power is determined for each information layer, and is one of the characteristics of each information layer.

Recently, various technologies have been studied in order to increase the capacity of information recording mediums. For example, according to one reported technology, a rewritable information recording medium including two information layers is used. By the laser light incident on one surface of the recording medium, information recording on, or information reproduction from, the two information layers is carried out (see Patent Document No. 2; Patent Document No. 3). With this technology, the recording capacity of the information recording medium can be doubled by using two information layers.

In an information recording medium allowing information to be recorded on, or reproduced from, two information layers by laser light incident on one surface thereof, information recording on, and reproduction from, an information layer farther from the incidence side (hereinafter, referred to as the "first information layer") is carried out by the laser light which has been transmitted through an information layer closer to the incidence side (hereinafter, referred to as the "second information layer"). Where the transmittance of the second information layer is low, the energy of the laser light reaching the first information layer is attenuated. In addition, since the light reflected by the first information layer is transmitted through the second information layer again, the light reflected by the first information layer is further attenuated and the intensity thereof is decreased. Therefore, the quality of the reproduction signal based on the reflected light is lowered.

Considering the light attenuation in the second information layer, it is conceivable to record the information on the first information layer with more intensive laser light. However, in this case, the first information layer needs to be irradiated with laser light of a higher power. When the power of the laser light exceeds the limit of the recording apparatus, preferable recording cannot be realized, and the recording quality is deteriorated. In this case, the second information layer is irradiated with more intense laser light with no deterioration. Therefore, in the information recording layer closest to the laser light incidence side, signal deterioration due to reproduction is likely to occur, and it tends to be difficult to improve the reproduction durability.

For the above-described reasons, it is preferable that the second information layer has a maximum possible transmittance. In order to realize an information recording medium having an increased number of information layers, for example, three or four information layers, for the purpose of increasing the capacity, it is necessary to further increase the transmittance of the information layer on the incidence side (third or fourth information layer). Especially, it is desirable that an information layer closest to the laser light incidence side has a maximum possible transmittance because light is transmitted through this information layer in order to record information on, or reproduce information from, an information layer farther from the laser incidence side. In general, recording materials have a large extinction coefficient. Therefore, it is preferable that the recording layer of the information layer on the laser light incidence side is thin in order to have a high transmittance.

This tendency regarding the reproduction durability is applicable both to a rewritable information recording medium and a write once recording medium. In the case of a rewritable information recording medium, erasure performance of the recording layer also needs to be considered as described above. Therefore, it is necessary to adjust the recording layer or the like so as to provide both of good erasure performance and good reproduction durability.

Citation List

Patent Literature

Patent Document No. 1: Japanese Patent Application Laid-Open Publication No. 2001-14679

Patent Document No. 2: Japanese Patent Application Laid-Open Publication No. 2001-36130

Patent Document No. 3: the pamphlet of International Publication 03/025922

SUMMARY OF INVENTION

Technical Problem

However, generally in the case of a rewritable information recording medium, as the recording layer formed of a phase-changeable material is thinner, the crystallization rate thereof is decreased. Hence, the phase change from the amorphous phase to the crystalline phase is unlikely to occur, and the information erasure performance is deteriorated. For this reason, occasionally, the recording layer of the information layer closer to the laser light incidence side is made thicker, and is formed of a phase-changeable material which is crystallized more rapidly, than the recording layer of the information layer farther from the laser light incidence side. However, when the crystallization rate is increased, the reproduction durability is declined. Hence, the crystallization rate should not be too high.

In a recordable information recording medium, where the recording layer included in the information layer is too thin, the characteristics of the information layer are declined. For example, in the case of a rewritable information recording medium, where the recording layer is too thin, it is difficult to provide both of good erasure performance and good reproduction durability. For this reason, in an information recording medium including three or more information layers, there is a problem that information reproduction cannot be conducted at high quality from an information layer closest to the laser light incidence side, which is required to have a high transmittance.

The present invention made in light of the above-described problems has an object of providing an information recording medium including three or more information layers, which allows information to be reproduced from all the information layers at high quality. The present invention also has an object of providing a recording apparatus, a reproducing apparatus and a reproducing method suitable to such an information recording medium.

Solution to Problem

An information recording medium according to the present invention includes. N number (N is an integer fulfilling N≧3) of information layers on which information is recordable, and allows information to be recorded on each of the information layers and allows information recorded on each of the information layers to be reproduced by being irradiated with laser light. The N number of information layers include an N'th information layer, an (N−1)th information layer, an (N−2)th information layer, . . . a second information layer and a first information layer sequentially located from a laser light incidence side. A reflectance of the N'th information layer is $R_N$, and a reflectance of an M'th information layer (M refers to every integer fulfilling N>M≧1) is $R_M$. The laser light used to irradiate the N'th information layer for reproducing information recorded on the N'th information layer has an upper limit reproduction power $Pr_{Nmax}$, and the laser light used to irradiate the M'th information layer for reproducing information recorded on the M'th information layer has an upper limit reproduction power $Pr_{Mmax}$. The following expressions (1) and (2) are concurrently fulfilled:

$$R_N > R_M \tag{1}$$

$$Pr_{Nmax} < Pr_{Mmax} \tag{2}$$

In a preferable embodiment, the reflectance $R_N$ of the N'th information layer and the reflectance $R_{N-1}$ of the (N−1)th information layer fulfill the following expression (3):

$$R_N/R_{N-1} \geq 1.2 \tag{3}$$

In a preferable embodiment, a product $R_N \times Pr_{Nmax}$ of the reflectance $R_N$ and the upper limit reproduction power $Pr_{Nmax}$ of the N'th information layer is equal to a product $R_{N-1} \times Pr_{N-1max}$ of the reflectance $R_{N-1}$ and the upper limit reproduction power $Pr_{N-1max}$ of the (N−1)th information layer.

In a preferable embodiment, the N'th information layer and the (N−1)th information layer each include at least a reflection layer, a first dielectric layer, a recording layer which is phase-changeable by being irradiated with laser light, and a second dielectric layer. The second dielectric layer, the recording layer, the first dielectric layer and the reflection layer are located in this order from the laser light incidence side. The second dielectric layer, the recording layer, the first dielectric layer and the reflection layer of the N'th information layer are each formed of the same material as that of a corresponding layer of the (N−1)th information layer.

In a preferable embodiment, the N'th information layer and the (N−1)th information layer each further include a transmittance adjusting layer located on a surface of the reflection layer opposite from the laser light incidence side. The transmittance adjusting layer of the N'th information layer is formed of the same material as that of the transmittance adjusting layer of the (N−1)th information layer.

In a preferable embodiment, N is 3.

A reproducing apparatus according to the present invention, for reproducing information recorded on the information recording medium described in any of the above, reproduces the information recorded on the N'th information layer at a reproduction power $Pr_N$ ($Pr_N \leq Pr_{Nmax}$); and reproduces the information recorded on the (N−1)th information layer at a reproduction power $Pr_{N-1}$ ($Pr_{N-1} \leq Pr_{N-1max}$).

A recording apparatus according to the present invention, for recording information on the information recording medium described in any of the above, records information by irradiating the information recording medium with the laser light.

A reproducing method according to the present invention, for reproducing information recorded on the information recording medium described in any of the above, includes the steps of reproducing information recorded on the N'th information layer at a reproduction power $Pr_N$ ($Pr_N \leq Pr_{Nmax}$); and reproducing information recorded on the (N−1)th information layer at a reproduction power $Pr_{N-1}$ ($Pr_{N-1} \leq Pr_{N-1max}$). A product $R_N \times Pr_N$ of the reflectance $R_N$ and the reproduction power $Pr_N$ of the N'th information layer is equal to a product $R_{N-1} \times Pr_{N-1}$ of the reflectance $R_{N-1}$ and the reproduction power $Pr_{N-1}$ of the (N−1)th information layer.

In a preferable embodiment, the laser light has a wavelength λ in the range of 400 nm to 410 nm; and an objective lens used for focusing the laser light on each of the information layers has a numerical aperture NA in the range of 0.84 to 0.86.

Advantageous Effects of Invention

According to an information recording medium of the present invention, the reflectance $R_N$ of the N'th information layer is made higher than the reflectance $R_M$ of the other information layers. Owing to this, even where the reproduction power of the N'th information layer is decreased, high quality information reproduction from the N'th information layer can be realized. This makes it possible to adopt a structure in which the upper limit reproduction power of the N'th information layer is lower than the upper limit reproduction power of the other information layers. This improves the degree of designing freedom. This permits importance to be placed on the transmittance for designing, which makes it possible to increase the transmittance of the N'th information layer than by the conventional art and also to increase the intensity of the laser light reaching the (N−1)th information layer from the N'th information layer. As a result, high quality information reproduction can be realized also from the first information layer through the (N−1)th information layer.

According to a reproducing method for an information recording medium of the present invention, the product of the reflectance and the reproduction power of the N'th information layer is equal to the product of the reflectance and the reproduction power of the (N−1)th information layer. Therefore, even where the reproduction power of the N'th information layer is lower than the reproduction power of the (N−1)th information layer, high quality information reproduction from the N'th information layer can be realized.

DESCRIPTION OF EMBODIMENTS

Figure 1:
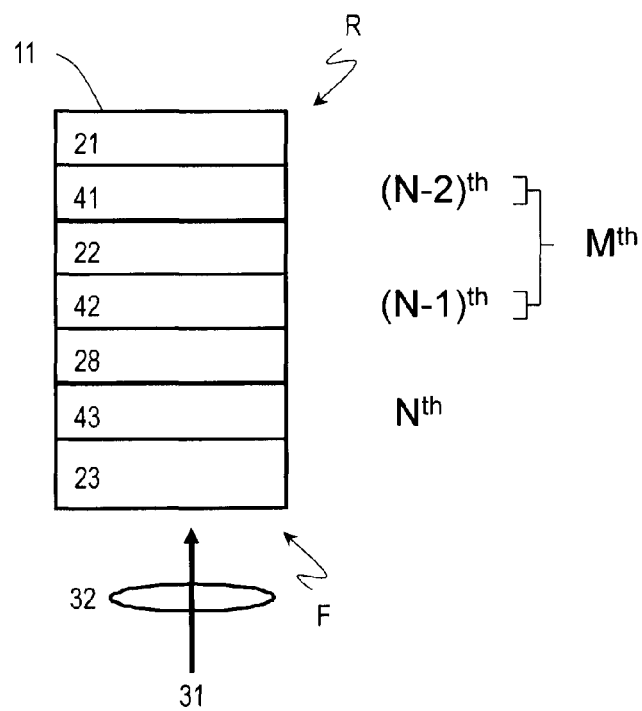
FIG. 1(a) is a partial cross-sectional view showing an embodiment of an information recording medium according to the present invention.
FIG. 1(b) is a schematic view provided for explaining the reflectance of light reflected by each information layer.
Figure 1:
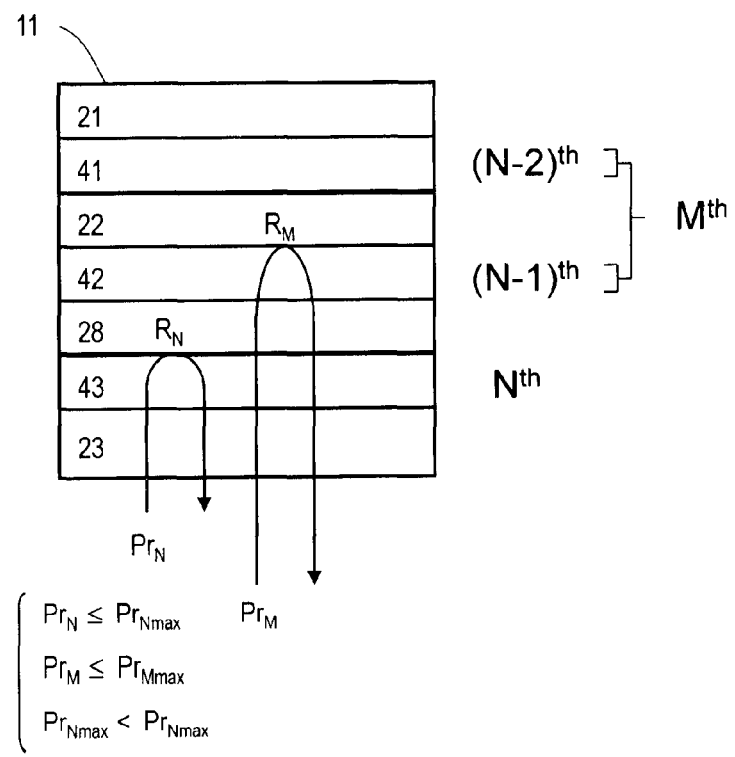

Hereinafter, embodiments of an information recording medium, a recording apparatus, a reproducing apparatus and a reproducing method according to the present invention will be described with reference to the drawing. The following embodiments are merely examples, and the present invention is not limited to these embodiments. In the following embodiments, identical elements bear identical reference numerals and the repetition of the same description may occasionally be omitted in order to eliminate the redundancy of repeating the same explanations.

(Embodiment 1)

An embodiment of an information recording medium according to the present invention will be described. FIG. 1(a) is a partial cross-sectional view of an information recording medium 11 according to an embodiment of the present invention. The information recording medium 11 includes N number of information layers. A recording apparatus or a reproducing apparatus irradiates each of the information layers with laser light 31 focused by the objective lens 32, and thus information is recorded on each information layer or information recorded on each information layer is reproduced. N is an integer fulfilling N≧3. In this embodiment, N is 3. N may be 4 or greater.

As shown in FIG. 1(a), the N number of information recording layers of the information recording medium 11 include a third information layer 43, a second information layer 42, and a first information layer 41 sequentially located in this order from an incidence side F of the laser light 31. Namely, an N'th information layer, an (N−1)th information layer, an (N−2)th information layer, the second information layer and the first information layer are sequentially located in this order from the laser light 31 incidence side F. The information layers excluding the N'th information layer, i.e., the information layers from the first information layer through the (N−1)th information layer, will be each referred to as the "M'th information layer". Instead of each of the terms "first" through "(N−1)'th" used regarding the location of the information layers, "M'th" will be used. M refers to every integer fulfilling N>M≧1.

In the specification of this application, the term "information layer" refers to a layered body having a structure on which information can be recorded. A specific structure of the information layer will be described below in detail. The N number of information layers are also referred to as the L0 layer, L1 layer, ..., L(N−1) layer sequentially from the information layer farthest from the laser light 31 incidence side F to the information layer closest to the laser light 31 incidence side F.

Preferably, the information recording layer 11 further includes a separation layer 28 located between the second information layer 42 and the third information layer 43, a separation layer 22 located between the first information layer 41 and the second information layer 42, and a substrate 21. The three information layers stacked while sandwiching the separation layers 22 and 28 are supported by the substrate 21 such that the first information layer 41 is located on the side of the substrate 21. More preferably, the information recording layer 11 further includes a transparent layer 23 located closer to the laser light 31 incidence side F than the third information layer 43.

A recording apparatus or a reproducing apparatus adjusts the distance between the objective lens 32 and each information layer of the information recording medium 11 to focus the laser light 31, such that the laser light 31 transmitted through the transparent layer 23 forms a beam spot of a prescribed size on the information layer to be used for information recording or reproduction. Information is recorded on that information layer, or information recorded on that information layer is reproduced.

As the wavelength λ of the laser light 31 is shorter, the laser light 31 can be focused by the objective lens 32 to form a smaller beam spot. However, where the wavelength λ is too short, the absorbance of the transparent layer 23 or the like on the laser light 31 is too high. For this reason, the wavelength λ of the laser light 31 is preferably in the range of 350 nm to 450 nm.

The laser light 31 reaching a certain information layer closer to the substrate 21 than the third information layer 43 of the information recording medium 11 is attenuated by being transmitted through an information layer closer to the laser light 31 incidence side F than the certain information layer. For this reason, it is preferable that the first information layer 41 and the second information layer 42 have a high recording sensitivity. It is also preferable that the second information layer 42 and the third information layer 43 have a high transmittance.

The substrate 21 is shaped like a discus, and supports each of the first information layer 41 through the transparent layer 23. In a surface of the substrate 21 facing the first information layer 41, a guide groove for guiding the laser light 31 may be formed. A surface of the substrate 21 on an opposite side R to the first information layer 41 is preferably smooth. Materials usable for the substrate 21 include, for example, polycarbonate resins, polymethylmethacrylate resins, polyolefin resins, norbornene-based resins, glass, and any appropriate combination thereof. Especially, polycarbonate resins are superb in transferability and mass-producibility and available at low cost, and so are preferable as a material for the substrate 21.

The separation layers 22 and 28 are provided in order to adjust the height (position), in the thickness direction of the information recording medium 11, of the first information layer 41, the second information layer 42 and the third information layer 43 supported by the substrate 21. By adjusting the position of each information layer, the laser light 31 can be collected only on a desired information layer by the objective lens 32 and also can be put into a diverged state in the other information layers. This allows information to be recorded on, or reproduced from, a desired information layer even in an information recording medium including a plurality of information layers. Namely, the separation layers 22 and 28 adjusts the focusing position in the information recording medium 11.

Desirably, the separation layers 22 and 28 have a thickness which is equal to or greater than the focus depth determined by the numerical aperture NA of the objective lens 32 and the wavelength λ of the laser light 31. Where the separation layers 22 and 28 are too thick, the distance from the laser light 31 incidence side F to the first information layer 41 of the information recording medium 11 is too long. This enlarges the coma aberration when the information recording medium 11 is tilted with respect to the laser light 31, which makes it difficult to accurately collect the laser light 31 to the first information layer 41. Namely, from the viewpoint of reduction of the coma aberration, it is preferable that the separation layers 22 and 28 are thinner. Where λ=405 nm and NA=0.85, the thickness of each of the separation layers 22 and 28 is preferably in the range of 5 μm to 50 μm.

It is preferable that the separation layers 22 and 28 have a low absorbance of light having a wavelength of the laser light 31. In a surface of each of the separation layers 22 and 28 on the laser light 31 incidence side F, a guide groove for guiding the laser light 31 may be formed. Materials usable for the separation layers 22 and 28 include, for example, polycarbonate resins, polymethylmethacrylate resins, polyolefin resins, norbornene-based resins, UV curable resins, delayed-action thermosetting resins, glass, and any appropriate combination thereof.

The transparent layer 23 is provided closer to the laser light 31 incidence side F than the third information layer 43 and protects the third information layer 43. It is preferable that the transparent layer 23 has a low absorbance of light having a wavelength of the laser light 31. Materials usable for the transparent layer 23 include, for example, polycarbonate resins, polymethylmethacrylate resins, polyolefin resins, norbornene-based resins, UV curable resins, delayed-action thermosetting resins, glass, and any appropriate combination thereof. A sheet formed of such a material may be used for the transparent layer 23.

Where the transparent layer 23 is too thin, the function of protecting the third information layer 43 is not sufficiently provided. Where the transparent layer 23 is too thick, the distance from the laser light 31 incidence side to the first information layer 41 of the information recording medium 11 is too long as in the case of the separation layers and 28. This enlarges the coma aberration when the information recording medium 11 is tilted with respect to the laser light 31, which makes it difficult to accurately collect the laser light 31 to the first information layer 41. Where NA=0.85, the thickness of the transparent layer 23 is preferably in the range of 5 μm to 150 μm, and more preferably in the range of 40 μm to 110 μm.

For the information recording medium in this embodiment, in order to realize high quality information reproduction from all the N number of information layers, the reflectance of the information layer closest to the laser light 31 incidence side F, among the N number of information layers, namely, the N'th information layer, is set to be higher than the reflectance of the other information layers, and the upper limit reproduction power of, the N'th information layer is set to be lower than the upper limit reproduction power of the other information layers.

Specifically, where as shown in FIG. 1(b), the reflectance of the N'th information layer is $R_N$ and the reflectance of the M'th information layer (M is an integer fulfilling $N > M \geq 1$) is $R_M$, all the integers M fulfilling N>M≧1 satisfy the relationship represented by the following expression (1).

$$R_N > R_M \quad (1)$$

The reflectance $R_N$ and the reflectance $R_M$ are defined as follows. Light incident on the information recording medium 11 from the laser light 31 incidence side F is reflected by the N'th information layer and the M'th information layer and goes out toward the laser light 31 incidence side F of the information recording medium 11. The reflectance $R_N$ and the reflectance $R_M$ are defined by the ratio of the amount of light going out toward the laser light 31 incidence side F with respect to the amount of light incident on the information recording medium 11. Neither the reflectance $R_N$ nor the reflectance $R_M$ is defined in a state of only the N'th information layer or only the M'th information layer.

As shown in FIG. 1(b), the upper limit reproduction power of the laser light used to irradiate the N'th information layer for reproducing information recorded on the N'th information layer is $Rr_{Nmax}$, and the upper limit reproduction power of the laser light used to irradiate the M'th information layer for reproducing information recorded on the M'th information layer is $Rr_{Mmax}$. All the integers M fulfilling the N>M≧1 satisfy the relationship represented by the following expression (2).

$$Pr_{Nmax} > Pr_{Mmax} \quad (2)$$

For the conventional information recording mediums, the reflectance and the upper limit reproduction power of the information layers are set to have the same value in order to uniformize the reproduction performance and the other characteristics of the information layers. By contrast, for the information recording medium 11 in this embodiment, the reflectance $R_N$ of the N'th information layer is made higher than the reflectance $R_M$ of the other information layers (M'th information layers). Owing to this, even where the reproduction power of the N'th information layer is decreased, the amount of the reflected light can be increased. Accordingly, high quality information reproduction from the N'th information layer can be realized. The laser light incident on the N'th information layer is not transmitted through any other information layer before being incident on the N'th information layer, and so is not attenuated in the intensity. However, the reproduction power of the N'th information layer can be decreased, and therefore the information recorded on the N'th information layer can be suppressed from being deteriorated. Also, since the upper limit reproduction power of the N'th information layer is made lower than that of the other information layers, the recording layer of the N'th information layer does not need to have a high reproduction durability. Therefore, the degree of freedom for selecting the material for the recording layer is increased, and so the degree of designing freedom is also increased. This permits more importance to be placed on the transmittance for designing the information recording medium, which makes it possible to increase the transmittance of the N'th information layer than by the conventional art and also to increase the intensity of the laser light reaching the (N−1)th information layer from the N'th information layer. Accordingly, high quality information reproduction can be realized also from the first information layer through the (N−1)th information layer.

Preferably, the reflectance $R_N$ of the N'th information layer and the reflectance $R_{N-1}$ of the (N−1)th information layer fulfill the following expression (3).

$$R_N/R_{N-1} \geq 1.2 \quad (3)$$

This allows the reflectance $R_N$ of the N'th information layer to be sufficiently higher than the reflectance $R_{N-1}$ of the (N−1)th information layer. Even where the reproduction power of the N'th information layer is decreased, the amount of the reflected light from the N'th information layer can be sufficiently large. Accordingly, high quality information reproduction from the N'th information layer can be realized more certainly.

Preferably, the product of the reflectance $R_N$ and the upper limit reproduction power $Pr_{Nmax}$ of the N'th information layer, i.e., $R_N \times Pr_{Nmax}$, is equal to the product of the reflectance $R_{N-1}$ and the upper limit reproduction power $Pr_{N-1max}$ of the (N−1)th information layer, i.e., $R_{N-1} \times Pr_{N-1max}$. Herein, the term "equal" refers to the case where the two products match each other exactly and also the case where the two products match each other within the range of about ±5%. Specifically, the term "equal" refers to the case where the relationship represented by the following expression (4) is fulfilled.

[Expression 1]

$$0.95 \leq \left| \frac{R_{N-max} \times Pr_{N-max}}{R_{Nmax} \times Pr_{Nmax}} \right| \leq .05 \quad (4)$$

Where such a relationship is fulfilled, the amount of the reflected light from the N'th information layer and the amount of the reflected light from the (N−1)th information layer are approximately equal to each other. Therefore, the quality of a reproduction signal obtained when the information recorded on the N'th information layer is to be reproduced and the quality of a reproduction signal obtained when the information recorded on the (N−1)th information layer is to be reproduced can be of approximately the same level.

Figure 2:
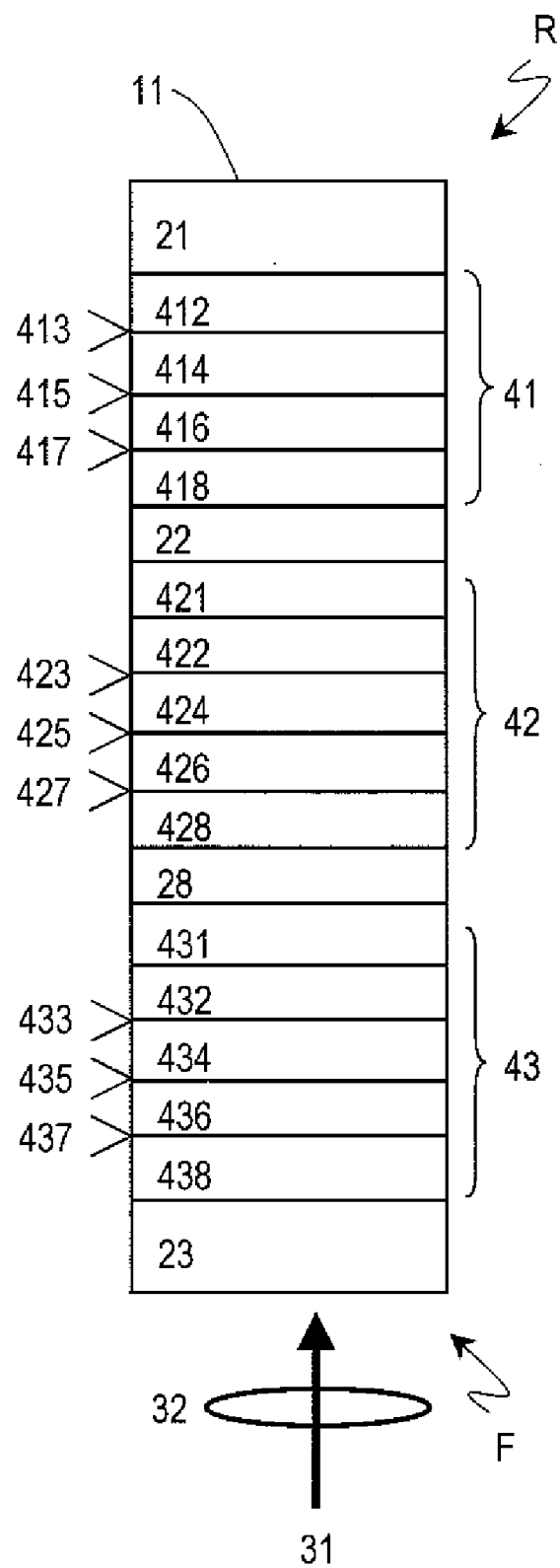
FIG. 2 is a partial cross-sectional view showing a structure of the information recording medium shown in FIG. 1 in detail.

FIG. 2 is a partial cross-sectional view of the information recording medium 11, which shows each of the information layers shown in FIG. 1 in more detail. As shown in FIG. 2, it is preferable that the first information layer 41 includes a second dielectric layer 418, a recording layer 416, a first dielectric layer 414, and a reflection layer 412. The second dielectric layer 418, the recording layer 416, the first dielectric layer 414 and the reflection layer 412 are provided sequentially in this order from the laser light 31 incidence side F.

A reflection layer side interface layer 413 may be optionally provided between the reflection layer 412 and the first dielectric layer 414. Similarly, a first interface layer 415 may be provided between the first dielectric layer 414 and the recording layer 416. A second interface layer 417 may be provided between the second dielectric layer 418 and the recording layer 416.

Preferably, the second information layer 42 includes a second dielectric layer 428, a recording layer 426, a first dielectric layer 424, a reflection layer 422, and a transmittance adjusting layer 421. The second dielectric layer 428, the recording layer 426, the first dielectric layer 424, the reflection layer 422 and the transmittance adjusting layer 421 are provided sequentially in this order from the laser light 31 incidence side F.

A reflection layer side interface layer 423 may be optionally provided between the reflection layer 422 and the first dielectric layer 424. Similarly, a first interface layer 425 may be provided between the first dielectric layer 424 and the recording layer 426. A second interface layer 427 may be provided between the second dielectric layer 428 and the recording layer 426.

Preferably, the third information layer 43 includes a second dielectric layer 438, a recording layer 436, a first dielectric layer 434, a reflection layer 432, and a transmittance adjusting layer 431. The second dielectric layer 438, the recording layer 436, the first dielectric layer 434, the reflection layer 432 and the transmittance adjusting layer 431 are provided sequentially in this order from the laser light 31 incidence side F.

A reflection layer side interface layer 433 may be optionally provided between the reflection layer 432 and the first dielectric layer 434. Similarly, a first interface layer 435 may be provided between the first dielectric layer 434 and the recording layer 436. A second interface layer 437 may be provided between the second dielectric layer 438 and the recording layer 436.

Now, each layer included in the first information layer 41 will be described. The recording layer 416 is formed of a material reversibly phase-changeable between a crystalline phase and an amorphous phase when being irradiated with the laser light 31. A material usable for the recording layer 416 contains any one of (Ge—Sn)Te, GeTe—$Sb_2Te_3$, (Ge—Sn)Te—$Sb_2Te_3$, GeTe—$Bi_2Te_3$, (Ge—Sn)Te—$Bi_2Te_3$, GeTe—$(Sb—Bi)_2Te_3$, (Ge—Sn)Te—$(Sb—Bi)_2Te_3$, GeTe—$(Bi—In)_2Te_3$, (Ge—Sn)Te—$(Bi—In)_2Te_3$, Sb—Te, Sb—Ge, (Gb—Te)—Ge, Sb—In, (Sb—Te)—In, Sb—Ga and (Sb—Te)—Ga. It is preferable that the amorphous phase part of the recording layer 416 is easily changeable to the crystalline phase by being irradiated with the laser light for recording and is not easily changeable to the crystalline phase when not being irradiated with laser light.

Where the recording layer 416 is too thin, none of a sufficient reflectance, reflectance change rate and erasability is provided. Where the recording layer 416 is too thick, the thermal capacity is too large and so the recording sensitivity is reduced. Therefore, the thickness of the recording layer 416 is preferably in the range of 5 nm to 15 nm, and more preferably in the range of 8 nm to 12 nm.

The reflection layer 412 has an optical function of increasing the amount of light absorbed to the recording layer 416 and a thermal function of diffusing the heat generated in the recording layer 416. A material usable for the reflection layer 412 contains at least one element selected from Ag, Au, Cu and Al. For example, an alloy such as Ag—Cu, Ag—Ga—Cu, Ag—Pd—Cu, Ag—Nd—Au, AlNi, AlCr, Au—Cr or Ag—In is usable. Especially, an alloy of Ag has a high thermal conductivity and so is preferable as a material of the reflection layer 412. As the reflection layer 412 is thicker, the thermal diffusion function thereof is higher. However, where the reflection layer 412 is too thick, the thermal diffusion function is too high and so the recording sensitivity of the recording layer 416 is reduced. Therefore, the thickness of the reflection layer 412 is preferably in the range of 30 nm to 200 nm, and more preferably in the range of 70 nm to 140 nm.

The first dielectric layer 414 is located between the recording layer 416 and the reflection layer 412. The first dielectric layer 414 has a thermal function of adjusting the thermal diffusion from the recording layer 416 to the reflection layer 412 and an optical function of adjusting the reflectance, the absorptivity and the like of the reflection, layer 412 and the recording layer 416. Materials usable for the first dielectric layer 414 include, for example, oxides such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$, $DyO_2$ and the like; sulfides such as ZnS, CdS and the like; single-element carbides such as SiC and the like; and mixtures thereof. Such mixtures include, for example, $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, ZnS—$SiO_2$, and $SnO_2$—SiC. Especially, ZnS—$SiO_2$ is superb as a material of the second dielectric layer. ZnS—$SiO_2$ is formed into a film at high speed, is transparent, and has good mechanical characteristics and good moisture resistance.

Where the first dielectric layer 414 is too thick, the cooling effect on the reflection layer 412 is too weak. This excessively decreases the thermal diffusion from the recording layer 416 and makes it difficult for the recording layer 416 to be changed into the amorphous phase. Where the first dielectric layer 414 is too thin, the cooling effect on the reflection layer 412 is too strong. This excessively increases the thermal diffusion from the recording layer 416 and reduces the sensitivity of the recording layer 416. Therefore, the thickness of the first dielectric layer 414 is preferably in the range of 2 nm to 40 nm, and more preferably in the range of 8 nm to 30 nm.

The reflection layer side interface layer 413 acts to prevent the material of the first dielectric layer 414 from corroding or destroying the reflection layer 412. Specifically, where the reflection layer 412 is formed of a material containing Ag and the first dielectric layer 414 is formed of a material containing S (e.g., ZnS—$SiO_2$), the reflection layer side interface layer 413 prevents Ag from being corroded by reaction with S.

A material usable for the reflection layer side interface layer 413 is a metal material other than Ag, for example, Al or an Al alloy. Other materials usable for the reflection layer side interface layer 413 include dielectric materials not containing S, for example, oxides such as $ZrO_2$, $HfO_2$, ZnO, $SiO_2$, $SnO_2$, $Cr_{2O3}$, $TiO_2$, $In_{2O3}$, $Ga_2O_3$, $Y_2O_3$, $CeO_2$, $DyO_2$ and the like; single-element carbides such as SiC and the like; and mixtures thereof. Such mixtures include, for example, $ZrO_2$—$SiO_2$, $ZrO_2$—$SiO_2$—$Cr_2O_2$, $ZrO_2$—$SiO_2$—$Ga_2O_2$, $HfO_2$—$SiO_2$—$Cr_2O_3$, $ZrO_2$—$SiO_2$—$In_2O_3$, and $SnO_2$—SiC. C or the like is also usable.

Where the reflection layer side interface layer 413 is too thick, the reflection layer side interface layer 413 obstructs the thermal and optical functions of the first dielectric layer 414. Where the reflection layer side interface layer 413 is too thin, the function of preventing the corrosion or the destruction of the reflection layer 412 is declined. Therefore, the thickness of the reflection layer side interface layer 413 is preferably in the range of 1 nm to 100 nm, and more preferably in the range of 5 nm to 40 nm.

The first interface layer 415 acts to prevent substance migration between the first dielectric layer 414 and the recording layer 416, which would otherwise be caused by the recording being conducted in repetition. Preferably, the first interface layer 415 is formed of a material which has a melting point sufficiently high to protect the first interface layer 415 from being melted at the time of recording and has good adhesion with the recording layer 416. Materials usable for the first interface layer 415 include, for example, oxides such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$, $DyO_2$ and the like; sulfides such as ZnS, CdS and the like; single-element carbides such as SiC and the like; and mixtures thereof. Such mixtures include, for example, $ZrO_2$—$SiO_2$, $ZrO_2$—$SiO_2$—$Cr_2O_3$, $ZrO_2$—$SiO_2$—$Ga_2O_3$, $HfO_2$—$SiO_3$—$_{Cr2}O_3$, $ZrO_2$—$SiO_2$—$In_2O_3$, ZnS—$SiO_2$, and $SnO_2$—SiC. C or the like is also usable. Especially, $Ga_2O_3$, ZnO and $In_2O_3$, for example, are preferable as a material of the first interface layer 415 because of good adhesion thereof with the recording layer 416.

Where the first interface layer 415 is too thin, the effect as an interface layer cannot be provided. Where the first interface layer 415 is too thick, the first interface layer 415 obstructs the thermal and optical functions of the first dielectric layer 414. Therefore, the thickness of the first interface layer 415 is preferably in the range of 0.3 nm to 15 nm, and more preferably in the range of 1 nm to 8 nm.

The second dielectric layer 418 is located closer to the layer light 31 incidence side F than the recording layer 416, and has a function of preventing the recording layer 416 from being corroded or deformed and an optical function of adjusting the reflectance, the absorptivity and the like of the recording layer 416. Materials usable for the second interface layer 418 are the same as those usable for the first dielectric layer 414. Especially, ZnS—$SiO_2$ is superb as a material of the second dielectric layer 418 because ZnS—$SiO_2$ is formed into a film at high speed, is transparent, and has good mechanical characteristics and good moisture resistance.

Where the second dielectric layer 418 is too thin, the function of preventing the recording layer 416 from being corroded or deformed is declined. The thickness of the second dielectric layer 418 can be precisely determined by a calculation based on the Matrix Method so as to fulfill the conditions for increasing the difference in the amount of light reflected by the recording layer 416 between where the recording layer 416 is in the crystalline phase and where the recording layer 416 is in the amorphous phase. The thickness of the second dielectric layer 418 is preferably in the range of 20 nm to 80 nm.

The second interface layer 417, like the first interface layer 415, acts to prevent substance migration between the second dielectric layer 418 and the recording layer 416, which would otherwise be caused by the recording being conducted in repetition. Therefore, the second interface layer 417 is preferably formed of a material which has substantially the same performances as those of the first interface layer 415.

The thickness of the second interface layer 417 is preferably in the range of 0.3 nm to 15 nm, and more preferably in the range of 1 nm to 8 nm, like the first interface layer 415.

The information layer 41 is formed of the reflection layer 412, the first dielectric layer 414, the recording layer 416 and the second dielectric layer 418, and optionally the reflection side interface layer 413, the first interface layer 415 and the second interface layer 417.

Now, each layer included in the second information layer 42 will be described. Materials usable for the recording layer 426 are the same as those usable for the first recording layer 416 of the first information layer 41. The thickness of the first recording layer 426 is preferably 10 nm or less, and more preferably in the range of 4 nm to 8 nm, in order to increase the transmittance of the second information layer 42.

The reflection layer 422 has substantially the same functions as those of the reflection layer 412 of the first information layer 41. Specifically, the reflection layer 422 has an optical function of increasing the amount of light absorbed to the recording layer 426 and a thermal function of diffusing the heat generated in the recording layer 426. Therefore, materials usable for the reflection layer 422 are the same as those usable for the reflection layer 412 of the first information layer 41. Especially, an alloy of Ag has a high thermal conductivity and so is preferable as a material of the reflection layer 422.

The thickness of the reflection layer 422 is preferably 20 nm or less, and more preferably in the range of 3 nm to 14 nm, in order to increase the transmittance of the second information layer 42. Since the thickness of the reflection layer 422 is in this range, the optical and thermal functions of the reflection layer 422 are sufficiently provided.

The first dielectric layer 424 has substantially the same functions as those of the first dielectric layer 414 of the first information layer 41. Specifically, the first dielectric layer 424 has a thermal function of adjusting the thermal diffusion from the recording layer 426 to the reflection layer 422 and an optical function of adjusting the reflectance, the absorptivity and the like of the reflection layer 422 and the recording layer 426. Therefore, materials usable for the first dielectric layer 424 are the same as those usable for the first dielectric layer 414 of the first information layer 41.

The thickness of the first dielectric layer 424 is preferably in the range of 1 nm to 40 nm, and more preferably in the range of 4 nm to 30 nm, in order to provide the optical and thermal functions thereof sufficiently.

The second dielectric layer 428 has substantially the same functions as those of the second dielectric layer 418 of the first information layer 41. Specifically, the second dielectric layer 428 has a function of preventing the recording layer 426 from being corroded or deformed and an optical function of adjusting the reflectance, the absorptivity and the like of the recording layer 426. Therefore, materials usable for the second dielectric layer 428 are the same as those usable for the second dielectric layer 418 of the first information layer 41. The thickness of the second dielectric layer 428 can be precisely determined by a calculation based on the Matrix Method so as to fulfill the conditions for increasing the difference in the amount of light reflected by the recording layer 426 between where the recording layer 426 is in the crystalline phase and where the recording layer 426 is in the amorphous phase.

The transmittance adjusting layer 421 is formed of a dielectric material and has a function of adjusting the transmittance of the second information layer 42. Owing to the transmittance adjusting layer 421, the transmittance Tc (%) of the second information layer 42 where the recording layer 426 is in the crystalline phase and the transmittance Ta (%) of the second information layer 42 where the recording layer 426 is in the amorphous phase can both be improved.

Material usable for the transmittance adjusting layer 421 include, for example, oxides such as $TiO_2$, $ZrO_2$, $HfO_2$, ZnO, $Nb_2O_5$, $Ta_2O_5$, $Al_2O_3$, $SiO_2$, $Cr_2O_3$, $CeO_2$, $Ga_2O_3$, $Bi_2O_3$ and the like; nitrides such as Ti—N, Zr—N, Nb—N, Ge—N, Cr—N, Al—N and the like; single-element sulfides such as ZnS; and mixtures thereof. The refractive index $n_t$ and the extinction coefficient $k_t$ of the transmittance adjusting layer 421 preferably have the relationships of $n_t \geq 2.4$ and $k_t \leq 0.1$, in order to improve the transmittance Tc and the transmittance Ta. Therefore, it is preferable to use $TiO_2$ or a material containing $TiO_2$ among the above-listed materials, for the following reason. Since such a material has a large refractive index ($n_t$=2.6 to 2.8) and a small extinction coefficient ($k_t$=0.0 to 0.1), the transmittance adjusting layer 421 formed of such a material effectively improves the transmittance of the second information layer 42.

Where the thickness of the transmittance adjusting layer 421 is approximately $\lambda 8 n_t$ (where $\lambda$ is the wavelength of the laser light 31 and $n_t$ is the refractive index of the material of the transmittance adjusting layer 491), the transmittance Tc and the transmittance Ta can be effectively improved. Where $\lambda$=405 nm and $n_t$=2.6, the thickness of the transmittance adjusting layer 491 is preferably in the range of 5 nm to 36 nm in consideration of other conditions including the reflectance and the like.

The reflection layer side interface layer 423, the first interface layer 425 and the second interface layer 427 respectively have substantially the same functions as those of the reflection layer side interface layer 413, the first interface layer 415 and the second interface layer 417 of the first information layer 41, and can be formed of the same materials as those of the corresponding layers included in the first information layer 41.

The layers included in the third information layer 43 have equivalent functions, and can be formed of the same materials, as those of the corresponding layers included in the second information layer 42. Specifically, it is preferable that the second dielectric layer 438, the recording layer 436, the first dielectric layer 434, the reflection layer 432 and the transmittance adjusting layer 431 of the third information layer 43 are respectively formed of the same materials as those used for forming the second dielectric layer 428, the recording layer 426, the first dielectric layer 424, the reflection layer 422 and the transmittance adjusting layer 421 of the second information layer 42.

The materials used for forming the layers included in the first information layer 41, the second information layer 42 and the third information layer 43, the separation layers 22 and 28, and the transparent layer 23 are selected from the above-listed materials, and the thickness of each layer is determined from the above-described preferable range, such that the information recording medium 11 fulfills the expressions (1) through (4). The information recording medium 11 having such a structure can be designed by, for example, a method substantially the same as the method for designing a known rewritable two-layer recording medium.

The information recording medium 11 can be produced by a method described below. First, the first information layer 41 is stacked on the substrate 21 (thickness: e.g., 1.1 mm). The first information layer 41 is formed of a plurality of layers, each of which can be sequentially formed by sputtering. The substrate 21 may have a high moisture absorptivity depending on the material thereof. Therefore, a substrate annealing step of removing the moisture may be optionally carried out before the sputtering.

Each layer can be formed by sputtering a sputtering target of the material used to form the respective layer in an atmosphere of a noble gas such as Ar gas, Kr gas, Xe gas or the like or a mixed gas atmosphere of a noble gas and a reactive gas (at least one type of gas selected from oxygen gas and nitrogen gas). As the sputtering method, either DC sputtering or RF sputtering, whichever is suitable for a respective case, is selected. Usually, DC sputtering, which increases the film formation rate, is preferable. However, some materials such as dielectric materials and the like having a low conductivity may occasionally not be sputtered by DC sputtering. In such a case, each layer is formed by RF sputtering. A dielectric material having a high conductivity or a dielectric material treated to have an improved conductivity during the formation of the sputtering target can be sputtered by DC sputtering or pulse DC sputtering.

The composition of each layer formed by sputtering may occasionally not completely match the original composition of the material used for forming the sputtering target. For example, an oxide is likely to cause oxygen loss as a result of sputtering. Such oxygen loss can be compensated for by using oxygen gas as a reactive gas. The composition of the material used for forming the sputtering target is determined such that the layer formed by sputtering can have a desired composition. The compositions of the sputtering target and the layer formed by sputtering can be checked by analysis using, for example, an X-ray microanalyzer.

The information recording medium 11 is specifically produced as follows. First, the reflection layer 412 is formed on the substrate 21. The reflection layer 412 can be formed by DC-sputtering a sputtering target formed of a metal or an alloy to be used for the reflection layer 412 in a noble gas atmosphere or a mixed gas atmosphere of a noble gas and a reactive gas.

Next, the reflection layer side interface layer 413 is optionally formed on the reflection layer 412. The reflection layer side interface layer 413 can be formed by sputtering a sputtering target formed of a material to be used for the reflection layer side interface layer 413 in a noble gas atmosphere or a mixed gas atmosphere of a noble gas and a reactive gas. In the case where the material for the reflection layer side interface layer 413 is a metal or any other material having a high conductivity, DC sputtering may be used; whereas in the case where the material for the reflection layer side interface layer 413 is an oxide or any other material having a low conductivity, RF sputtering may be used.

Next, the first dielectric layer 414 is formed on the reflection layer side interface layer 413 or the reflection layer 412. The first dielectric layer 414 can be formed by sputtering a sputtering target formed of a material to be used for the first dielectric layer 414 in a noble gas atmosphere or a mixed gas atmosphere of a noble gas and a reactive gas, mainly using RF sputtering. RF sputtering is used because most of the materials usable for the first dielectric layer 414 have a low conductivity and DC sputtering is not suitable.

Next, the first interface layer 415 is optionally formed on the first dielectric layer 414. The first interface layer 415 can be formed by sputtering a sputtering target formed of a material to be used for the first interface layer 415 in a noble gas atmosphere or a mixed gas atmosphere of a noble gas and a reactive gas, mainly using RF sputtering.

Next, the recording layer 416 is formed on the first interface layer 415 or the first dielectric layer 414. The recording layer 416 can be formed by sputtering a sputtering target formed of a material to be used for the recording layer 416 in a noble gas atmosphere, mainly using DC sputtering.

Next, the second interface layer 417 is optionally formed on the recording layer 416. The second interface layer 417 can be formed by sputtering a sputtering target formed of a material to be used for the second interface layer 417 in a noble gas atmosphere or a mixed gas atmosphere of a noble gas and a reactive gas, mainly using RF sputtering.

Next, the second dielectric layer 418 is formed on the second interface layer 417 or the recording layer 416. The second dielectric layer 418 can be formed by sputtering a sputtering target formed of a material to be used for the second dielectric layer 418 in a noble gas atmosphere or a mixed gas atmosphere of a noble gas and a reactive gas, mainly using RF sputtering.

The first information layer 41 is stacked on the substrate 21 in this manner, and then the separation layer 22 is formed on the first information layer 41. The separation layer 22 can be formed as follows. A UV curable resin (e.g., an acrylic-based resin or an epoxy-based resin) or a delayed-action thermosetting resin is applied to the first information layer 41. The entirety of the resultant body is rotated to uniformly extend the resin on the first information layer 41 (spin-coating), and then the resin is cured. In the case where the separation layer 22 is to have a guide groove for the laser light 31, the guide groove can be formed as follows. A substrate (pattern substrate) having a groove therein is closely attached to the pre-curing resin, and the entirety of the assembly is rotated for spin-coating. After the resin is cured, the substrate (pattern substrate) is removed.

The recording layer 416 of the first information layer 41 is usually in an amorphous state when being formed (as-depo state). Therefore, an initialization step of crystallizing the recording layer 416 may be optionally carried out by, for example, irradiating the recording layer 416 with laser light.

Next, the second information layer 42 is formed on the separation layer 22. Specifically, first, the transmittance adjusting layer 421 is formed on the separation layer 22. The transmittance adjusting layer 421 can be formed by sputtering a sputtering target formed of a material to be used for the transmittance adjusting layer 421 in a noble gas atmosphere or a mixed gas atmosphere of a noble gas and a reactive gas, using RF sputtering or DC sputtering.

Next, the reflection layer 422 is formed on the transmittance adjusting layer 421. The reflection layer 422 can be formed in substantially the same manner as the reflection layer 412 of the first information layer 41.

Next, the reflection layer side interface layer 423 is optionally formed on the reflection layer 422. The reflection layer side interface layer 423 can be formed in substantially the same manner as the reflection layer side interface layer 413 of the first information layer 41.

Next, the first dielectric layer 424 is formed on the reflection layer side interface layer 423 or the reflection layer 422. The first dielectric layer 424 can be formed in substantially the same manner as the first dielectric layer 414 of the first information layer 41.

Next, the first interface layer 425 is optionally formed on the first dielectric layer 424. The first interface layer 425 can be formed in substantially the same manner as the first interface layer 415 of the first information layer 41.

Next, the recording layer 426 is formed on the first interface layer 425 or the first dielectric layer 424. The recording layer 426 can be formed in substantially the same manner as the recording layer 416 of the first information layer 41.

Next, the second interface layer 427 is optionally formed on the recording layer 426. The second interface layer 427 can be formed in substantially the same manner as the second interface layer 417 of the first information layer 41.

Next, the second dielectric layer 428 is formed on the second interface layer 427 or the recording layer 426. The second dielectric layer 428 can be formed in substantially the same manner as the second dielectric layer 418 of the first information layer 41.

The second information layer 42 is stacked on the separation layer 22 in this manner, and then the separation layer 28 is formed on the second information layer 42. The separation layer 28 can be formed in substantially the same manner as the separation layer 22.

After the second dielectric layer 428 is formed or after the separation layer 28 is formed, an initialization step of crystallizing the recording layer 426 may be optionally carried out by, for example, directing the laser light.

Next, the third information layer 43 is stacked on the separation layer 28. Specifically, the transmittance adjusting layer 431, the reflection layer 432, the first dielectric layer 434, the recording layer 436 and the second dielectric layer 438 are sequentially formed on the separation layer 28 in this order. Optionally, the reflection layer side interface layer 433 may be formed between the reflection layer 432 and first dielectric layer 434. The first interface layer 435 may be formed between the first dielectric layer 434 and the recording layer 436. The second interface layer 437 may be formed between the second dielectric layer 438 and the recording layer 436. These layers can each be formed in substantially the same manner as the corresponding layer of the second information layer 42.

The third information layer 43 is stacked on the separation layer 28 in this manner, and then the transparent layer 23 is formed on the third information layer 43.

The transparent layer 23 can be formed as follows. A UV curable resin (e.g., an acrylic-based resin or an epoxy-based resin) or a delayed-action thermosetting resin is applied to the third information layer 43, spin-coated, and cured. Alternatively, the transparent layer 23 may be formed by use of a discus-shaped plate or sheet formed of a polycarbonate resin, a polymethylmethacrylate resin, a polyolefin resin, a norbornene-based resin, glass or the like. In this case, the transparent layer 23 can be formed as follows. A UV curable resin or a delayed-action thermosetting resin is applied to the third information layer 43. The plate or sheet is closely attached to the applied resin, and the resin is spin-coated. Then, the UV curable resin or the delayed-action thermosetting resin is cured. According to another method, a viscous resin is uniformly applied to the plate or sheet, and then the plate or sheet is closely attached to the second dielectric layer 438.

After the second dielectric layer 438 is formed or after the transparent layer 23 is formed, an initialization step of crystallizing the recording layer 426 may be optionally carried out by, for example, directing the laser light.

In this manner, the information recording layer 11 can be produced. In this embodiment, sputtering is used for forming each of the layers included in the information layers. The present invention is not limited to this, and vacuum vapor deposition, ion plating, MBE (Molecular Beam Epitaxy) or the like is also usable.

In this embodiment, the information recording medium 11 including three information layers is described. An information recording medium including four or more information layers can be produced in substantially the same method.

In this embodiment, the recording layers 416, 426 and 436 are reversibly phase-changeable between the crystalline phase and the amorphous phase, and the information recording medium 11 is a rewritable optical recording medium. The information recording medium 11 may be a write once optical recording medium. In such a case, the recording layers 416, 426 and 436 may be irreversibly phase-changeable. A material usable for an irreversibly phase-changeable layer is, for example, Te—O—Pd or the like. In such a case, the thickness of the recording layer 416 of the first information layer 41 is preferably in the range of 10 nm to 50 nm, and the thickness of each of the recording layer 426 of the second information layer 42 and the recording layer 436 of the third information layer 43 is preferably in the range of 6 nm to 30 nm.

(Embodiment 2)

Hereinafter, embodiments of a recording apparatus, a reproducing apparatus and a reproducing method for an information recording medium according to the present invention will be described with reference to the drawings. In this embodiment, a recording apparatus for recording information on the information recording medium 11 described in Embodiment 1, and a reproducing apparatus and a reproducing method for reproducing information recorded on the information recording medium 11 will be described.

Figure 3:
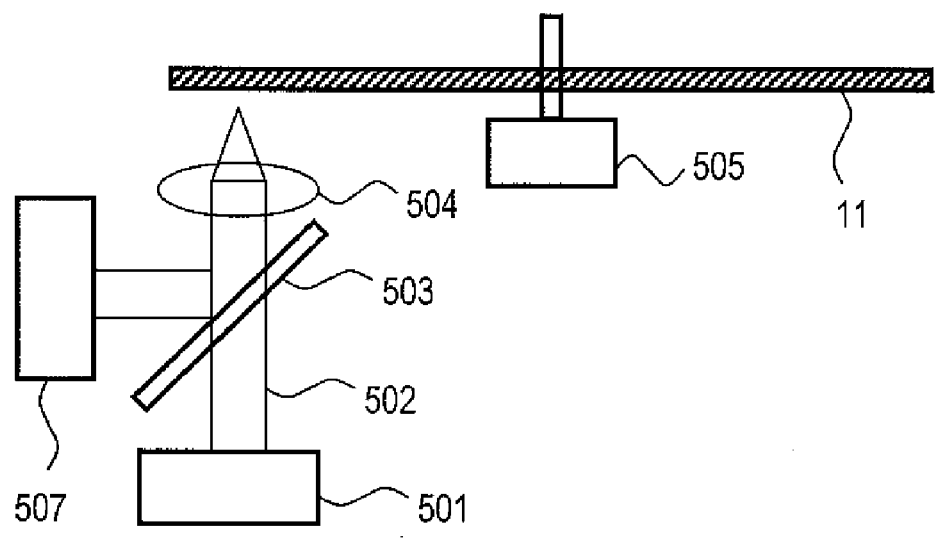
FIG. 3 is a schematic block diagram showing an embodiment of a recording/reproducing apparatus according to the present invention.

FIG. 3 is a schematic view showing an example of a structure of a recording/reproducing apparatus which is a recording apparatus and also a reproducing apparatus in this embodiment. The recording/reproducing apparatus shown in FIG. 3 includes a laser diode 501, a half mirror 503, an objective lens 504, a motor 505, and a photodetector 507.

The motor 505 is a driving section for rotating and driving the information recording medium 11, and rotates the information recording medium 11 placed thereon. The laser diode 501 is a light source for emitting laser light 502. The laser light 502 emitted from the laser diode 501 is transmitted through the half mirror 503 and is collected by the objective lens 504 toward the information recording medium 11.

For reproducing information recorded on the information recording medium 11, the reflected light of the laser light 502 is detected by the photodetector 507. Specifically, the distance between the objective lens 504 and the information recording medium 11 is adjusted to focus the laser light 502 to the information layer on which the information to be reproduced is recorded. A guide groove formed in the information layer is scanned by the focused laser light 502. The reflected light of the laser light 502 from the information layer is guided by the half mirror 503 to the photodetector 507, and the reflected light is detected by the photodetector 507. At the time of reproduction, a high frequency current may be superimposed on the driving current for the laser diode 501 to output the laser light 502. In this manner, the recording/reproducing apparatus in this embodiment irradiates each recording layer of the information recording medium 11 with the laser light 502 and detects the light reflected by each recording layer to reproduce information.

For the above operation, in order to suppress the deterioration of the information recorded on the information layer, namely, the recording mark or space, the intensity of the laser light 502 used to irradiate the information layer is set to be equal to or lower than the upper limit reproduction power. As described in Embodiment 1, in the case where the information recording medium 11 includes number of information layers, the upper limit reproduction power of the laser light used to irradiate the N'th information layer is $Pr_{Nmax}$, and the upper limit reproduction power of the laser light used to irradiate the M'th information layer is $Pr_{Mmax}$ regarding all the integers M fulfilling the relationship of $N>M \geq 1$. $Pr_{Nmax}$ and $Pr_{Mmax}$ fulfill the relationship of $Pr_{Nmax} < Pr_{Mmax}$.

The reproduction power of the laser light 502 used for actually reproducing the information recorded on each information layer is equal to or lower than the above-described upper limit reproduction power. Specifically, the reproduction power $Pr_N$ used for reproducing the information recorded on the N'th recording layer fulfills the relationship of $Pr_N < Pr_{Nmax}$. The reproduction power $Pr_M$ used for reproducing the information recorded on the M'th recording layer fulfills the relationship of $Pr_M \leq Pr_{Mmax}$. Accordingly, where $M=N-1$, the reproduction power $Pr_{N-1}$ used for reproducing the information recorded on the (N−1)th information layer fulfills the relationship of $Pr_{N-1} \leq Pr_{N-1 max}$.

As described in Embodiment 1, the reflectance $R_N$ of the N'th information layer and the reflectance $R_M$ of the M'th information layer fulfill the relationship of $R_N > R_M$, where M is an arbitrary integer fulfilling the relationship of $N > M \geq 1$. Accordingly, where $M=N-1$, the reflectance $R_{N-1}$ of the (N−1)th information layer fulfills the relationship of $R_N > R_{N-1}$. At this point, the reproduction powers are set such that the product of the reflectance $R_N$ and the reproduction power $Pr_N$ of the N'th information layer, namely, $R_N \times Pr_N$, is equal to the product of the reflectance $R_{N-1}$ and the reproduction power $Pr_{N-1}$ of the (N−1)th information layer, namely, $R_{N-1} \times Pr_{N-1}$. Herein, the term "equal" refers to the case where the two products match each other exactly and also the case where the two products match each other within the range of about ±5%. Specifically, the term "equal" refers to the case where the relationship represented by the following expression (5) is fulfilled.

[Expression 2]

$$0.95 \leq \left| \frac{R_{N-} \times Pr_{N-}}{R_N \times Pr_N} \right| \leq .05 \quad (5)$$

Where such a condition is fulfilled, the intensity of the reflected light obtained when the information is to be reproduced from the N'th information layer and the intensity of the reflected light obtained when the information is to be reproduced from the (N−1)th information layer are approximately equal to each other, and thus the quality variance of the reproduction signal can be suppressed. In addition, the reflectance $R_N$ of the N'th information layer is made higher than the reflectance $R_M$ of the other information layers (M'th information layers). Owing to this, even where the reproduction power of the N'th information layer is decreased, the amount of the reflected light can be increased. Accordingly, high quality information reproduction from the N'th information layer can be realized. The laser light incident on the N'th information layer is not transmitted through any other information layer before being incident on the N'th information layer, and so is not attenuated in the intensity. However, the reproduction power of the N'th information layer can be decreased, and therefore the information recorded on the N'th information layer can be suppressed from being deteriorated. Also, since the reproduction power of the N'th information layer is decreased, the recording layer of the N'th information layer does not need to have a high reproduction durability. Therefore, the degree of freedom for selecting the material for the recording layer is increased. This makes it possible to select a material having a higher transmittance and to increase the intensity of the laser light reaching the (N−1)th information layer from the N'th information layer. Accordingly, high quality information reproduction can be realized also from the first information layer through the (N−1)th information layer.

Figure 4:
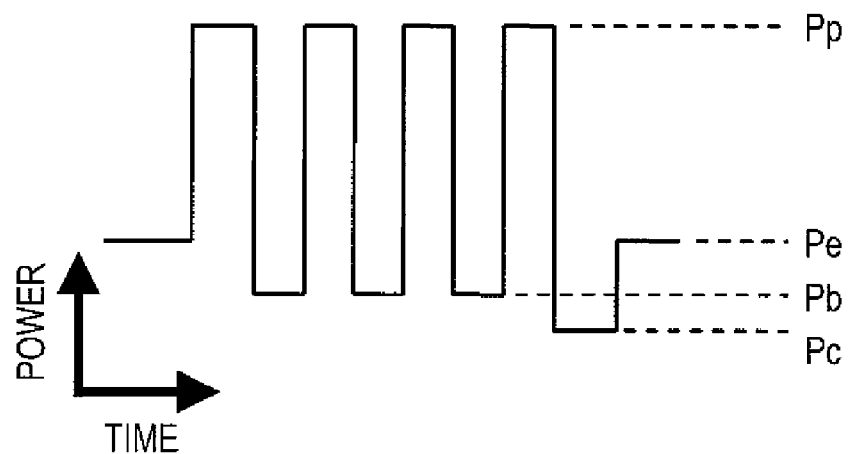
FIG. 4 is a schematic view showing an example of a recording pulse waveform usable for recording information on the information recording medium shown in FIG. 1 using the recording/reproducing apparatus shown in FIG. 3.

For recording information on the information recording medium 11, a modulation signal modulated by the information to be recorded is generated, and the intensity of the laser light 502 is modulated by the modulation signal among a plurality of power levels. As means for modulating the laser intensity, current modulation means for modulating a driving current for a semiconductor laser is usable. For a part in which a recording mark is to be formed, a single rectangular pulse having a peak power of Pp may be used. For forming an especially long mark, a recording pulse sequence including a plurality of pulse sequences modulated between the peak power Pp and a bottom power Pb (Pp>Pb) as shown in FIG. 4 is usable in order to eliminate extra heat and make the mark widths uniform. After the final pulse, a cooling zone of a cooling power Pc may be provided. For a part in which no mark is to be formed, the intensity is kept constant at a bias power Pe (Pp>Pe). In this manner, the recording/reproducing apparatus in this embodiment irradiates each information layer of the information recording medium with the laser light 502 in accordance with the recording signal and thus records information.

The objective lens 504 preferably has a numerical aperture NA in the range of 0.5 to 1.1, and more preferably in the range of 0.6 to 0.9, in order to adjust the spot diameter of the laser light 502 to the range of 0.4 μm to 0.7 μm. The laser light 502 preferably has a wavelength λ in the range of 350 nm to 450 nm. A linear velocity of the information recording medium 11 for recording information is preferably in the range of 3 m/s to 40 m/s at which, recrystallization is unlikely to occur and a sufficient level of erasure performance is obtained, and more preferably in the range of 6 m/s to 30 m/s. Needless to say, the wavelength, the numerical aperture of the objective lens and the linear velocity may be of other values than those mentioned here, depending on the type of the information recording medium 11 or the like. For example, the wavelength λ of the laser light 502 may be 650 to 670 nm.

Using such a recording/reproducing apparatus, the performances of the information recording medium 11 can be evaluated. In the following, both of an evaluation method in compliance with a recording method for the BD format by which the capacity per layer is 25 GB, and an evaluation method in compliance with a recording method by which the capacity per layer is raised to 33.4 GB as a result of shortening the shortest mark length, will be described. The wavelength λ of the laser light 502 used for recording/reproduction is in the range of 400 nm to 410 nm, and the NA of the objective lens 504 is in the range of 0.84 to 0.86. Any other evaluation method in compliance with a recording method by which the capacity per layer is different from the above-mentioned capacities is usable, depending on the type of the information recording medium 11 or the like.

The recording performance of the information recording medium 11 can be evaluated as follows. The power of the laser light 502 is modulated in the range of 0 to Pp (mW), and random signals corresponding to mark lengths of 2T to 8T are recorded by a (1-7) modulation system. Jitter between the leading ends of the recording marks and jitter between the trailing ends of the recording marks (error of the mark positions) are measured by a time interval analyzer. As the value of the jitters is smaller, the recording performance is higher. The Recording powers Pp, Pb, Pc and Pe are determined such that the average value of the jitter between the leading ends and the jitter between the trailing ends is minimum. The optimal Pp value in this case is set as the recording sensitivity. In the case where the capacity per layer is 25 GB, the 2T mark length and the 8T mark length are respectively 0.149 μm and 0.596 μm. In the case where the capacity per layer is 33.4 GB, the 2T mark length and the 8T mark length are respectively 0.112 μm and 0.447 μm.

The performance of the information recording medium 11 regarding the signal strength can be evaluated as follows. The power of the laser light 502 is modulated in the range of 0 to Pp (mW). Signals corresponding to mark lengths of 2T and 9T are recorded alternately 10 consecutive times on the same track, and then the 2T signal is recorded for overwriting. The ratio (Carrier-to-Noise Ratio; CNR) of the carrier level to the noise level at the frequency of the 2T signal in this case is measured by a spectrum analyzer. As the CNR is higher, the signal strength is higher. In the case where the capacity per layer is 25 GB, the 9T mark length is 0.671 μm. In the case where the capacity per layer is 33.4 GB, the 9T mark length is 0.503 μm.

The erasure performance of the information recording medium 11 can be evaluated as follows. The power of the laser light 502 is modulated in the range of 0 to Pp (mW). 2T signals and 9T signals are recorded alternately 10 consecutive times on the same track, and then the 2T signal is recorded for overwriting at the 11th time. After this, the 9T signal is recorded for overwriting. The difference between the carrier level of the 2T signal after the final 2T signal recording and the carrier level of the 2T signal after the final 9T signal recording is measured by a spectrum analyzer as an erasability of the 2T signal. As the erasability is higher, the erasure performance is higher.

The upper limit reproduction power of the information recording medium 11 is evaluated by reproduction light deterioration. The reproduction light deterioration is defined as the deterioration amount of jitter or error rate obtained when a track having a signal recorded thereon is irradiated with reproduction light (reproduction power: Pr) a prescribed number of times (e.g., one million times). As the reproduction power is higher, the reproduction light deterioration is larger. The maximum value of power values at which the reproduction deterioration stays within the tolerable value range is the upper limit reproduction power.

Examples

Hereinafter, an information recording medium according to the present invention will be specifically described by way of examples.

In the examples, the information recording medium 11 shown in FIG. 1 and FIG. 2 was produced. The recording characteristics and the reproduction characteristics of each of the first information layer 41, the second information layer 42 and the third information layer 43 were examined, with the thickness of the recording layer 436 and the thickness of the second dielectric layer 438 of the third information layer 43 being varied. The items measured were the erasability of the third information layer 43 and the reflectance and the upper limit reproduction power of each information layer. The first information layer 41 and the second information layer 42 may, for example, have a structure substantially the same as that of a known rewritable two-layer information recording medium.

The reflectance of each information layer is the reflectance in the stacked state as described in Embodiment 1. Specifically, the reflectance is a value including an attenuation generated as a result of the laser light reaching the target information layer and light reflected by the target information layer being transmitted through another information layer located closer to the laser light 31 incidence side than the target information layer.

Samples were produced as follows. First, a polycarbonate substrate (diameter: 120 mm, thickness: 1.1 mm) having a guide groove (depth: 20 nm; track pitch: 0.32 μm) for guiding the laser light 31 was prepared as the substrate 21.

On the substrate 21, the following layers were sequentially stacked by sputtering: an Ag—Pd—Cu layer (thickness: 80 nm) as the reflection layer 412, a $(Zr-O_2)_{50}(In_2O_3)_{50}$ layer (thickness: 25 nm) as the first dielectric layer 414, a $(GeTe)_{97}(Bi_2Te_3)_3$ layer (thickness: 10 nm) as the recording layer, a $(ZrO_2)_{50}(Cr_2O_3)_{50}$ layer (thickness: 5 nm) as the second interface layer 417 (not shown), and a $(ZnS)_{80}(SiO_2)_{20}$ layer (thickness: 60 nm) as the, second dielectric layer 418.

A film formation apparatus for forming the layers by sputtering includes an Ag—Pd—Cu alloy sputtering target for forming the reflection layer 412, a $(Zr-O_2)_{50}(In_2O_3)_{50}$ sputtering target for forming the first dielectric layer 414, a $(GeTe)_{97}(Bi_2Te_3)_3$ sputtering target for forming the recording layer 416, a $(ZrO_2)_{50}(Cr_2O)_3)_{50}$ sputtering target for forming the second interface layer 417, and a $(ZnS)_{80}(SiO_2)_{20}$ sputtering target for forming the second dielectric layer 418. The sputtering targets each have a diameter of 100 mm and a thickness of 6 mm.

The reflection layer 412 was formed in an Ar gas atmosphere at a pressure of 0.3 Pa with a DC power source at a power of 100 W. The first dielectric layer 404 was formed in an Ar gas atmosphere at a pressure of 0.1 Pa with an RF power source at a power of 200 W. The recording layer 406 was formed in an Ar gas atmosphere at a pressure of 0.2 Pa with a DC power source at a power of 50 W. The second interface layer 407 was formed in an Ar gas atmosphere at a pressure of 0.1 Pa with an RF power source at a power of 200 W. The second dielectric layer 408 was formed in an Ar gas atmosphere at a pressure of 0.1 Pa with an RF power source at a power of 400 W.

Then, a UV curable resin was applied to the second dielectric layer 418 and covered with a substrate having a guide groove (depth: 20 nm; track pitch: 0.32 μm). The resultant body was rotated to form a uniform resin layer. After the resin was cured, the substrate was removed. As a result, the separation layer 22 having a thickness of 25 μm and having a guide groove for guiding the laser light 31 formed in a surface thereof facing the second information layer 42 was formed.

Then, on the separation layer 22, the following layers were sequentially stacked by sputtering: a $TiO_2$ layer (thickness: 20 nm) as the transmittance adjusting layer 421, an Ag—Pd—Cu layer (thickness: 10 nm) as the reflection layer 422, a $(ZrO_2)_{50}(In_2O_3)_{50}$ layer (thickness: 15 nm) as the first dielectric layer 424, a $(GeTe)_{96}(Bi_2Te_3)_4$ layer (thickness: 7 nm) as the recording layer 426, a $(ZrO_2)_{50}(Cr_2O_3)_{50}$ layer (thickness: 5 nm) as the second interface layer 427, and a $(ZnS)_{80}(SiO_2)_{20}$ layer (thickness: 40 nm) as the second dielectric layer 428.

A film formation apparatus for forming the layers by sputtering includes a $TiO_2$ sputtering target for forming the transmittance adjusting layer 421, an Ag—Pd—Cu alloy sputtering target for forming the reflection layer 422, a $(Zr—O_2)_{50}(In_2O_3)_{50}$ sputtering target for forming the first dielectric layer 424, a $(GeTe)_{97}(Bi_2Te_3)_3$ sputtering target for forming the recording layer 426, a $(ZrO_2)_{50}(Cr_2O_3)_{50}$ sputtering target for forming the second interface layer 427, and a $(ZnS)_{80}(SiO_2)_{20}$ sputtering target for forming the second dielectric layer 428. The sputtering targets each have a diameter of 100 mm and a thickness of 6 mm.

The transmittance adjusting layer 421 was formed in a mixed gas atmosphere of Ar and oxygen (containing oxygen gas at a ratio of 3% with respect to the entirety) at a pressure of 0.3 Pa with an RF power source at a power of 400 W. The reflection layer 422 was formed in an Ar gas atmosphere at a pressure of 0.3 Pa with a DC power source at a power of 100 W. The first dielectric layer 424 was formed in an Ar gas atmosphere at a pressure of 0.1 Pa with an RF power source at a power of 200 W. The recording layer 426 was formed in an Ar gas atmosphere at a pressure of 0.2 Pa with a DC power source at a power of 50 W. The second interface layer 427 was formed in an Ar gas atmosphere at a pressure of 0.1 Pa with an RF power source at a power of 200 W. The second dielectric layer 428 was formed in an Ar gas atmosphere at a pressure of 0.1 Pa with an RF power source at a power of 400 W.

Then, a UV curable resin was applied to the second dielectric layer 428 and covered with a substrate having a guide groove (depth: 20 nm; track pitch: 0.32 μm). The resultant body was rotated to form a uniform resin layer. After the resin was cured, the substrate was removed. As a result, the separation layer 28 having a thickness of 16 μm and having a guide groove for guiding the laser light 31 formed in a surface thereof facing the third information layer 43 was formed.

Then, on the separation layer 28, the following layers were sequentially stacked by sputtering: a $TiO_2$ layer (thickness: 30 nm) as the transmittance adjusting layer 431, an Ag—Pd—Cu layer (thickness: 8 nm) as the reflection layer 432, a $(ZrO_2)_{50}(In_2O_3)_{50}$ layer (thickness: 10 nm) as the first dielectric layer 434, a $(GeTe)_{96}(Bi_2Te_3)_4$ layer as the recording layer 436, a $(ZrO_2)_{50}(Cr_2O_3)_{50}$ layer (thickness: 5 nm) as the second interface layer 437, and a $(ZnS)_{80}(SiO_2)_{20}$ layer as the second dielectric layer 438.

A film formation apparatus for forming the layers by sputtering includes a $TiO_2$ sputtering target for forming the transmittance adjusting layer 431, an Ag—Pd—Cu alloy sputtering target for forming the reflection layer 432, a $(Zr—O_2)_{50}(In_2O_3)_{50}$ sputtering target for forming the first dielectric layer 434, a $(GeTe)_{96}(Bi_2Te_3)_4$ sputtering target for forming the recording layer 436, a $(ZrO_2)_{50}(Cr_2O_3)_{50}$ sputtering target for forming the second interface layer 437, and a $(ZnS)_{80}(SiO_2)_{20}$ sputtering target for forming the second dielectric layer 438. The sputtering targets each have a diameter of 100 mm and a thickness of 6 mm.

The transmittance adjusting layer 431 was formed in a mixed gas atmosphere of Ar and oxygen (containing oxygen gas at a ratio of 3% with respect to the entirety) at a pressure of 0.3 Pa with an RF power source at a power of 400 W. The reflection layer 432 was formed in an Ar gas atmosphere at a pressure of 0.3 Pa with a DC power source at a power of 100 W. The first dielectric layer 434 was formed in an Ar gas atmosphere at a pressure of 0.1 Pa with an RF power source at a power of 200 W. The recording layer 436 was formed in an Ar gas atmosphere at a pressure of 0.2 Pa with a DC power source at a power of 50 W. The second interface layer 437 was formed in an Ar gas atmosphere at a pressure of 0.1 Pa with an RF power source at a power of 200 W. The second dielectric layer 438 was formed in an Ar gas atmosphere at a pressure of 0.1 Pa with an RF power source at a power of 400 W.

Finally, a UV curable resin was applied to the second dielectric layer 438 and rotated to form a uniform resin layer. The resin was cured by UV radiation, and thus the transparent layer 23 having a thickness of 59 μm was formed. Then, an initialization step of crystallizing the recording layer 416, the recording layer 426 and the recording layer 436 by laser light was carried out. In this manner, a plurality of samples which were different in the thickness of the recording layer 436 and the thickness of the second dielectric layer 438 of the third information layer 43 were produced.

Regarding the samples of the information recording medium 11 thus obtained, the reflectance and the upper limit reproduction power of each information layer, and the erasability of the third information layer were measured using the recording/reproducing apparatus shown in FIG. 3. The wavelength of the laser light 31 was 405 nm, and the numerical aperture NA of the objective lens 32 was 0.85. The recording was conducted by a recording method by which the capacity per layer is 33.4 GB, and the shortest mark length (2T) was 0.112 μm. The linear velocity of the samples at the time of recording and measurement was 7.36 m/s.

Regarding each sample, Table 1 shows the thickness of the recording layer 436 and the thickness of the second dielectric layer 438 of the third information layer 43, and the erasure performance of the third information layer 43. The erasure performance is indicated as "○" when the erasability is 25 dB or higher, and as "×" when the erasability is lower than 25 dB.

Where the erasability is 25 dB or higher, the bit error rate can be $1.0 \times 10^{-5}$ or lower. In this case, the symbol error rate, which is the unit of information processing, is lower than $2.0 \times 10^{-4}$. A symbol error rate of $2.0 \times 10^{-4}$ involves no problem for practical use.

TABLE 1

| | Thickness of each layer of 3rd information layer | | Erasure performance of 3rd information layer | |
|---|---|---|---|---|
| Sample No. | Recording layer [nm] | 2nd dielectric layer [nm] | Erasability [dB] | Evaluation |
| 1-1 | 5.5 | 40.0 | 19 | X |
| 1-2 | 6.0 | 36.0 | 24 | X |
| 1-3 | 6.5 | 36.0 | 28 | ○ |
| 1-4 | 6.5 | 32.0 | 28 | ○ |
| 1-5 | 7.0 | 30.0 | 30 | ○ |

Regarding each sample, Table 2 shows the thickness of the recording layer 436 and the thickness of the second dielectric layer 438 of the third information layer 43, and the reproduction performance of the first information layer 41. The reproduction performance is indicated as follows. The reflectance and the upper limit reproduction power were first checked. A product of the reflectance and the upper limit reproduction power was defined as the reflected light amount. The reproduction performance is indicated as "○" when the reflected light amount is 2.2 or higher, and as "×" when the reflected light amount is lower than 2.2. Where the reflected light amount is 2.2, the quality of the information reproduction signal can be kept at a level at which there is no problem for practical use.

TABLE 2

| | Thickness of each layer of 3rd information layer | | Reproduction performance of 1st information layer | | | |
|---|---|---|---|---|---|---|
| Sample No. | Recording layer [nm] | 2nd dielectric layer [nm] | Reflectance [%] | Upper limit reproduction power [mW] | Reflected light amount | Evaluation |
| 1-1 | 5.5 | 40.0 | 1.9 | 1.3 | 2.5 | ○ |
| 1-2 | 6.0 | 36.0 | 1.7 | 1.4 | 2.4 | ○ |
| 1-3 | 6.5 | 36.0 | 1.6 | 1.4 | 2.2 | ○ |
| 1-4 | 6.5 | 32.0 | 1.6 | 1.4 | 2.2 | ○ |
| 1-5 | 7.0 | 30.0 | 1.5 | 1.4 | 2.1 | X |

Regarding each sample, Table 3 shows the thickness of the recording layer 436 and the thickness of the second dielectric layer 438 of the third information layer 43, and the reproduction performance of the second information layer 42. The reproduction performance is indicated as follows. The reflectance and the upper limit reproduction power were first checked. A product of the reflectance and the upper limit reproduction power was defined as the reflected light amount. The reproduction performance is indicated as "○" when the reflected light amount is 2.2 or higher, and as "×" when the reflected light amount is lower than 2.2.

TABLE 3

| | Thickness of each layer of 3rd information layer | | Reproduction performance of 2nd information layer | | | |
|---|---|---|---|---|---|---|
| Sample No. | Recording layer [nm] | 2nd dielectric layer [nm] | Reflectance [%] | Upper limit reproduction power [mW] | Reflected light amount | Evaluation |
| 1-1 | 5.5 | 40.0 | 2.0 | 1.2 | 2.4 | ○ |
| 1-2 | 6.0 | 36.0 | 1.8 | 1.3 | 2.3 | ○ |
| 1-3 | 6.5 | 36.0 | 1.7 | 1.3 | 2.2 | ○ |
| 1-4 | 6.5 | 32.0 | 1.7 | 1.3 | 2.2 | ○ |
| 1-5 | 7.0 | 30.0 | 1.6 | 1.3 | 2.1 | X |

Regarding each sample, Table 4 shows the thickness of the recording layer 436 and the thickness of the second dielectric layer 438 of the third information layer 43, and the reproduction performance of the third information layer 43. The reproduction performance is indicated as follows. The reflectance and the upper limit reproduction power were first checked. A product of the reflectance and the upper limit reproduction power was defined as the reflected light amount. The reproduction performance is indicated as "○" when the reflected light amount is 2.2 or higher, and as "×" when the reflected light amount is lower than 2.2.

As a summary of the above-mentioned results, Table 5 shows, regarding each sample, the thickness of the recording layer 436 and the thickness of the second dielectric layer 438 of the third information layer 43, the reproduction performance of each information layer, the erasure performance of the third information layer, and the total evaluation based on the reproduction performance and the erasure performance. The total evaluation was given as follows. A sample evaluated as "×" in any one of the items in the above evaluations is evaluated as "×". A sample evaluated as "○" in all the items in the above evaluations is evaluated as "⊚".

TABLE 4

| | Thickness of each layer of 3rd information layer | | Reproduction performance of 3rd information layer | | | |
|---|---|---|---|---|---|---|
| Sample No. | Recording layer [nm] | 2nd dielectric layer [nm] | Reflectance [%] | Upper limit reproduction power [mW] | Reflected light amount | Evaluation |
| 1-1 | 5.5 | 40.0 | 1.6 | 1.3 | 2.1 | X |
| 1-2 | 6.0 | 36.0 | 1.6 | 1.2 | 1.9 | X |
| 1-3 | 6.5 | 36.0 | 2.1 | 1.1 | 2.2 | ○ |
| 1-4 | 6.5 | 32.0 | 1.6 | 1.1 | 1.8 | X |
| 1-5 | 7.0 | 30.0 | 1.5 | 0.9 | 1.4 | X |

A sample evaluated as "⊚" in the total evaluation is practically usable, and a medium evaluated as "×" is not practically usable.

TABLE 5

| Sample No. | Thickness of each layer of 3rd information layer | | Reproduction performance | | | Erasure performance | Total evaluation |
|---|---|---|---|---|---|---|---|
| | Recording layer [nm] | 2nd dielectric layer [nm] | 1st information layer | 2nd information layer | 3rd information layer | 3rd information layer | |
| 1-1 | 5.5 | 40.0 | ○ | ○ | X | X | X |
| 1-2 | 6.0 | 36.0 | ○ | ○ | X | X | X |
| 1-3 | 6.5 | 36.0 | ○ | ○ | ○ | ○ | ⊚ |
| 1-4 | 6.5 | 32.0 | ○ | ○ | X | ○ | X |
| 1-5 | 7.0 | 30.0 | X | X | X | ○ | X |

Using the above results, Table 6 shows the reflectance, the upper limit reproduction power and the reflected light amount of each layer and the total evaluation of each sample.

TABLE 6

| Sample No. | Reflectance [%] | | | | Upper limit reproduction power [mW] | | | Reflected light amount (reflectance × upper limit reproduction power) [mW] | | | Total evaluation |
|---|---|---|---|---|---|---|---|---|---|---|---|
| | 1st (R1) | 2nd (R2) | 3rd (R3) | Ratio (R3/R2) | 1st | 2nd | 3rd | 1st | 2nd | 3rd | |
| 1-1 | 1.9 | 2.0 | 1.6 | 0.8 | 1.3 | 1.2 | 1.3 | 2.5 | 2.4 | 2.1 | X |
| 1-2 | 1.7 | 1.8 | 1.6 | 0.9 | 1.4 | 1.3 | 1.2 | 2.4 | 2.3 | 1.9 | X |
| 1-3 | 1.6 | 1.7 | 2.1 | 1.2 | 1.4 | 1.3 | 1.1 | 2.2 | 2.2 | 2.2 | ⊚ |
| 1-4 | 1.6 | 1.7 | 1.6 | 0.9 | 1.4 | 1.3 | 1.1 | 2.2 | 2.2 | 1.8 | X |
| 1-5 | 1.5 | 1.6 | 1.5 | 0.9 | 1.4 | 1.3 | 0.9 | 2.1 | 2.1 | 1.4 | X |

(1st: 1st information layer; 2nd: 2nd information layer; 3rd: 3rd information layer)

As shown in Tables 1 through 6, all the first through third information layers of the information recording medium 11 have good characteristics when the reflectance of the third information layer 43 closest to the laser light 31 incidence side is higher than that of the other information layers and the upper limit reproduction power of the third information layer 43 is lower than that of the other information layers.

When the reflectance of the third information layer is increased in this manner, high quality information reproduction from the third information layer can be realized even when the reproduction power of the third information layer is decreased. This makes it possible to adopt a structure in which the upper limit reproduction power of the third information layer is lower than the upper limit reproduction power of the other information layers. This permits the third information layer to be designed with importance being placed on the transmittance. Namely, since the reproduction power of the third information layer is made relatively low, the third information layer does not need to have a high reproduction durability. Thus, the third information layer can have a higher transmittance than by the conventional art while having a practical level of reproduction durability. In this manner, by increasing the transmittance of the third information layer, the amount of the laser light reaching the first information layer and the second information layer can be increased, and the high quality information reproduction from each of the first information layer and the second information layer can be realized.

When the ratio of the reflectance of the third information layer 43 with respect to the reflectance of the second information layer 42 is 1.2 or higher, the amount of the light reflected from the third information layer can be made sufficiently high and all the first through third information layers of the information recording medium 11 have good characteristics.

When the amount of the light reflected from the third information layer 43 and the amount of the light reflected from the second information layer 42 are equal to each other, the quality variance of the reproduction signal obtained when the information is to be reproduced from each of the third information layer and the second information layer can be suppressed.

In the examples, the recording layer 426 of the second information layer 42 and the recording layer 436 of the second information layer 43 are formed of the same material. These layers may be formed of different materials in order to adjust the crystallization rate.

The materials and thicknesses mentioned in the above embodiments and examples are merely examples of various materials and thicknesses usable for carrying out the present invention, and the present invention is not limited thereto. Materials other than the materials mentioned in the above embodiments and examples may be used, and each layer may be set to have a thickness other than the thicknesses mentioned in the above embodiments and examples.

Industrial Applicability

An information recording medium and a method for reproducing information from such an information recording medium according to the present invention are useful for improving the quality of information reproduction from an information recording medium including three or more information layers.

REFERENCE SIGNS LIST 11 information recording medium
21 substrate
22 separation layer
23 transparent layer
28 separation layer
31 laser light
32 objective lens
40 information layer
41 first information layer
42 second information layer
43 third information layer
402 reflection layer
403 reflection layer side interface layer
404 first dielectric layer
405 first interface layer
406 recording layer
407 second interface layer
408 second dielectric layer
412 reflection layer
413 reflection layer side interface layer
414 first dielectric layer
415 first interface layer
416 recording layer
417 second interface layer
418 second dielectric layer
421 transmittance adjusting layer
422 reflection layer
423 reflection layer side interface layer
424 first dielectric layer
425 first interface layer
426 recording layer
427 second interface layer
428 second dielectric layer
431 transmittance adjusting layer
432 reflection layer
433 reflection layer side interface layer
434 first dielectric layer
435 first interface layer
436 recording layer
437 second interface layer
438 second dielectric layer
501 laser diode
502 laser light
503 half mirror
504 objective lens
505 motor
506 information recording medium.
507 photodetector

The invention claimed is:

1. An information recording medium, comprising N number (N is an integer fulfilling $N \geq 3$) of information layers on which information is recordable, and allowing information to be recorded on each of the information layers and allowing information recorded on each of the information layers to be reproduced by being irradiated with laser light, wherein:
the N number of information layers include an N'th information layer, an (N−1)th information layer, an (N−2)th information layer, . . . sequentially located from a laser light incidence side;
a reflectance of the N'th information layer is $R_N$, and a reflectance of an M'th information layer (M refers to every integer fulfilling $N > M \geq 1$) is $R_M$;
the laser light used to irradiate the N'th information layer for reproducing information recorded on the N'th information layer has an upper limit reproduction power $Pr_{Nmax}$, and the laser light used to irradiate the M'th information layer for reproducing information recorded on the M'th information layer has an upper limit reproduction power $Pr_{Mmax}$; and
the following expressions (1) and (2) are concurrently fulfilled:

$$R_N > R_M \quad (1)$$

$$Pr_{Nmax} < Pr_{Mmax} \quad (2).$$

2. The information recording medium of claim 1, wherein the reflectance $R_N$ of the N'th information layer and the reflectance $R_{N-1}$ of the (N−1)th information layer fulfill the following expression (3):

$$R_N/R_{N-1} \geq 1.2 \quad (3).$$

3. The information recording medium of claim 1, wherein a product $R_N \times Pr_{Nmax}$ of the reflectance $R_N$ and the upper limit reproduction power $Pr_{Nmax}$ of the N'th information layer is equal to a product $R_{N-1} \times Pr_{N-1max}$ of the reflectance $R_{N-1}$ and the upper limit reproduction power $Pr_{N-1max}$ of the (N−1)th information layer.

4. The information recording medium of claim 1, wherein N is 3.

5. A reproducing apparatus for reproducing information recorded on the information recording medium of claim 1, comprising:
a disc motor for rotating the information recording medium of claim 1; and
an optical source for irradiating light on the information recording medium to reproducing the information recorded on the information recording medium, the reproducing apparatus reproduces:
the information recorded on the N'th information layer at a reproduction power $Pr_N$ ($Pr_N \leq Pr_{Nmax}$); and
the information recorded on the (N−1)th information layer at a reproduction power $Pr_{N-1}$ ($Pr_{N-1} \leq Pr_{N-1max}$).

6. A recording apparatus for recording information on the information recording medium of claim 1, comprising:
a disc motor for rotating the information recording medium of claim 1; and
an optical source for irradiating light on the information recording medium to recording the information on the information recording medium,
the recording apparatus recording information by irradiating the information recording medium with the laser light.

7. An information recording medium reproducing method for reproducing information recorded on the information recording medium of claim 1, the method comprising the steps of:
reproducing information recorded on the N'th information layer at a reproduction power $Pr_N$ ($Pr_N \leq Pr_{Nmax}$); and
reproducing information recorded on the (N−1)th information layer at a reproduction power $Pr_{N-1}$ ($Pr_{N-1} \leq Pr_{N-1max}$);
wherein a product $R_N \times Pr_N$ of the reflectance $R_N$ and the reproduction power $Pr_N$ of the N'th information layer is equal to a product $R_{N-1} \times Pr_{N-1}$ of the reflectance $R_{N-1}$ and the reproduction power $Pr_{N-1}$ of the (N−1)th information layer.

8. The information recording medium reproducing method of claim 7, wherein:
the laser light has a wavelength $\lambda$ in the range of 400 nm to 410 nm; and
an objective lens used for focusing the laser light on each of the information layers has a numerical aperture NA in the range of 0.84 to 0.86.

* * * * *

UNITED STATES PATENT AND TRADEMARK OFFICE
CERTIFICATE OF CORRECTION

PATENT NO.         : 8,259,556 B2
APPLICATION NO.    : 12/745086
DATED              : September 4, 2012
INVENTOR(S)        : Tomoyasu Takaoka, Shigeru Furumiya and Naoyasu Miyagawa It is certified that error appears in the above-identified patent and that said Letters Patent is hereby corrected as shown below:

In the Claims:

Col. 30, line 28 claim 5 "to reproducing the information" should read
-- to reproduce the information --; and Col. 30, line 39 claim 6 "to recording the information" should read
-- to record the information --.

Signed and Sealed this
Twenty-third Day of July, 2013

Teresa Stanek Rea
*Acting Director of the United States Patent and Trademark Office*